Patented July 4, 1933

1,916,295

UNITED STATES PATENT OFFICE

WILLIAM BAIRD, OF MANCHESTER, ENGLAND, ASSIGNOR TO IMPERIAL CHEMICAL INDUSTRIES LIMITED, A CORPORATION OF GREAT BRITAIN

ARTIFICIAL RESINOUS SUBSTANCE

No Drawing. Application filed October 5, 1931, Serial No. 567,125, and in Great Britain October 21, 1930.

The present invention relates to improvements in the manufacture of artificial resinous substances containing the condensation products of polyhydric alcohols and polybasic acids and non-hydroxylated fatty oils.

It is well known that non-hydroxylated fatty oils cannot be directly homogeneously commingled with polyhydric alcohol-polybasic acid condensation products (with the possible exception of certain of such products wherein the polyhydric alcohol used is a glycol) and various methods, e. g. the use of a high boiling solvent, the use of the fatty acids of the fatty oils, the use of a hydroxylated fatty oil, e. g. castor oil as a vehicle, have been devised to overcome this difficulty.

According to the present invention I prepare a homogeneous resinous product containing non-hydroxylated fatty oil by heating together a polyhydric alcohol (other than a glycol), a polybasic acid (or its anhydride) and a non-hydroxylated fatty oil in a closed vessel until the oil-condensation product mixture is homogeneous and afterwards in an open vessel until the desired interaction is complete.

This invention has as its object an improved process for incorporating non-hydroxylated oils into resins.

The non-hydroxylated fatty oils used in accordance with my invention include such oils as olive oil, menhaden oil, linseed oil, tung oil. The polyhydric alcohol may be e. g. glycerol, pentaerythritol, sorbitol, etc. The polybasic acid (or anhydride) may be e. g. succinic acid, phthalic acid, or the anhydride of such acids.

The first stage in the process in accordance with my invention, namely, heating the ingredients together in a closed vessel, is carried out at a temperature not less than about 150° C. and its duration is such that a mixture is obtained which is homogeneous except for globules of water, etc., formed as by-product. The second stage, namely, heating the reaction mixture in an open vessel (the actual vessel may be the same as or different from that used in the first stage) is preferably carried out at a somewhat lower temperature, and its duration is such that a desirable degree of condensation is reached, and all water produced as a by-product of the reaction is expelled.

The process possesses several advantages over other methods. For instance, it permits of the direct incorporation of any desired proportion of fatty oil. The risk of gelation occuring, which is particularly troublesome with short oil resins, (i. e. those in which there is less oil than resin, e. g. not more than about 40% of oil) is diminished. The facility with which fatty oil is incorporated depends, I find, on the rate at which chemical interaction in the first stage of the process of my invention proceeds. When condensation between e. g. glycerol and phthalic acid or anhydride takes place water is formed as a by-product and mass-action considerations suggest that when the water is prevented from escaping from the reacting system the rate of interaction of the other ingredients is changed. Thus, further in accordance with the invention, I may control the speed of interaction at this stage adding to the mixture water, the presence of which prevents the polyhydric alcohol and polybasic acid (or anhydride) from interacting before the prescribed temperature is reached in the first stage of my process. This I find is not only desirable but necessary when the polyhydric alcohol used is pentaerythritol.

The following examples illustrate the method of carrying out the invention but do not limit it. The parts are by weight.

Example I 31 parts of glycerol, 74 parts of phthalic anhydride and 45 parts of bleached menhaden oil are heated in an enamelled autoclave for 4 hours at 240° C., the pressure rising to about 90 lbs/sq. in. The cover of the autoclave is then removed and the heating continued for 1½ hours at 193° C., a clear homogeneous product being obtained. On cooling a dark colored resin is obtained which is hard, moderately flexible and easily soluble in aromatic hydrocarbons.

Example II 31 parts of glycerol, 74 parts of phthalic anhydride, 87 parts of linseed oil and 56 parts of tung oil are heated in an enamelled autoclave for 8 hours at 240° C., the pressure rising to 80–100 lbs/sq. in. The cover of the autoclave is then removed and the product, which is clear and homogeneous, is further heated for 4½ hours at 195° C. to remove all the water and complete the condensation.

The resin thus obtained is of a brown color, soft, very tough and pliable and soluble in the usual varnish solvents.

*Example III*

52 parts of glycerol, 124 parts of phthalic anhydride, 75 parts of linseed oil are heated at 200° C. and 80–90 lbs/sq. in. pressure for 4 hours. The almost clear viscous mass is now heated at 185° C. in the open for 2½ hours.

A similar product, less viscous, is obtained when 31 parts of glycerol, 74 parts of phthalic anhydride and 158 parts of linseed oil are used, or when tung oil is used instead of linseed oil.

*Example IV*

68 parts of pentaerythritol, 148 parts of phthalic anhydride, 93 parts of linseed oil and 34 parts of water are heated together at 200° C. for 4 hours. The pressure rises to 170 lbs/sq. in. The pale brown soft mass obtained is heated in the open at 175° C. until it is clear and frothing ceases, a clear, hard, moderately brittle resin being obtained.

When 324 parts of linseed oil is used and 54 parts of water the heating in the open is prolonged until a clear mass is obtained.

The marked improvement in the resins produced by my process as compared to those made by the conventional autoclave process is, I believe, due to the fact that the conditions are such as to cause an ester-interchange between the polyhydric alcohol and oil before the esterification reaction, which results in resinification, takes place. The properties of the two reactions, esterification and ester-interchange are quite different. Esterification takes place much more rapidly when the mixture is heated in an open vessel, but its progress is dependent upon a loss of water. Ester interchange although slower under certain conditions is not dependent upon the loss of water and is not retard appreciably by the presence of water. In my process ester interchange takes place during the heating in the autoclave but the esterification reaction is retarded. In the next step of the process wherein the heating is continued in an open vessel so that water may be evolved, the esterification reaction proceeds to form the completed resin. While polyhydric alcohols having more than two hydroxyl groups will in some instances, when heated in an open vessel with the oil and other ingredients in certain definite proportions, give a homogeneous resin, it will be apparent that the practice of the present invention is highly advantageous in the large number of instances in which the resin cannot be satisfactorily prepared by simply heating the ingredients together in accordance with the prior practice.

As many apparently widely different embodiments of this invention may be made without departing from the spirit and scope thereof, it is to be understood that I do not limit myself to the specific embodiments thereof except as defined in the following claims:

I claim:

1. A process for incorporating non-hydroxylated fatty oils into polyhydric alcohol-polybasic acid resins which comprises heating a polyhydric alcohol, an organic polybasic acid and a non-hydroxylated fatty oil in a closed vessel and then heating the reaction mixture in an open vessel until resinification takes place.

2. A process for incorporating non-hydroxylated fatty oils into polyhydric alcohol-polybasic acid resins which comprises heating a polyhydric alcohol, an organic polybasic acid and a non-hydroxylated fatty oil in a closed vessel at a temperature not less than 150° C. until a homogeneous mixture is obtained and then heating the reaction mixture in an open vessel at a lower temperature until resinification takes place.

3. A process for incorporating non-hydroxylated fatty oils into polyhydric alcohol-polybasic acid resins which comprises heating a polyhydric alcohol, an organic polybasic acid and a non-hydroxylated fatty oil in a closed vessel, adding water to the mixture, and then heating the reaction mixture in an open vessel until resinification takes place.

4. The process set forth in claim 2 in which the non-hydroxylated oil is a drying oil.

5. A process for incorporating non-hydroxylated fatty oils into polyhydric alcohol-polybasic acid resins which comprises heating glycerol, phthalic anhydride, and a non-hydroxylated oil in a closed vessel until a homogeneous mixture is obtained and then heating the reaction mixture in an open vessel until resinification takes place.

6. The process set forth in claim 5 in which the non-hydroxylated oil is selected from the class consisting of linseed oil, China-wood oil and menhaden oil.

In testimony whereof, I affix my signature.

WILLIAM BAIRD.